United States Patent
Sasa et al.

(10) Patent No.: US 7,061,847 B2
(45) Date of Patent: *Jun. 13, 2006

(54) OPTICAL RECORDING METHOD AND APPARATUS FOR AN OPTICAL STORAGE MEDIUM

(75) Inventors: Noboru Sasa, Kanagawa (JP); Tatsuya Tomura, Tokyo (JP); Soh Noguchi, Kanagawa (JP); Tsutomu Satoh, Kanagawa (JP); Yasunobu Ueno, Kanagawa (JP); Yasuhiro Higashi, Kanagawa (JP)

(73) Assignee: Ricoh Company, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/633,721

(22) Filed: Aug. 5, 2003

(65) Prior Publication Data

US 2004/0027959 A1   Feb. 12, 2004

Related U.S. Application Data

(63) Continuation of application No. 09/722,689, filed on Nov. 28, 2000, now Pat. No. 6,628,595.

(30) Foreign Application Priority Data

Nov. 29, 1999 (JP) .................................. 11-338613

(51) Int. Cl.
  *G11B 7/00* (2006.01)
(52) U.S. Cl. ...................................... 369/59.11
(58) Field of Classification Search ............. 369/59.11, 369/59.12, 116, 47.5, 47.51, 47.53, 13.24, 369/13.25, 13.26, 13.27
See application file for complete search history.

(56) References Cited

U.S. PATENT DOCUMENTS

| 5,315,402 A | | 5/1994 | Ito et al. |
| 5,391,741 A | | 2/1995 | Shimizu et al. |
| 5,513,165 A | * | 4/1996 | Ide et al. ............. 369/116 |
| 5,660,970 A | | 8/1997 | Shimizu et al. |
| 5,732,062 A | * | 3/1998 | Yokoi et al. ......... 369/116 |
| 5,740,149 A | | 4/1998 | Iwasaki et al. |
| 5,768,245 A | | 6/1998 | Maeda et al. |

(Continued)

FOREIGN PATENT DOCUMENTS

JP 01-229426 9/1989

(Continued)

*Primary Examiner*—Thang V. Tran
(74) *Attorney, Agent, or Firm*—Dickstein Shapiro Morin & Oshinsky LLP

(57) ABSTRACT

In an optical recording method and apparatus for an optical storage medium, a recording pulse pattern having a sequence of multiple pulses is used to record one of plural kinds of marks with different lengths on the storage medium through a variable-linear-velocity recording process or a constant-angular-velocity recording process. Two or more discrete write powers are individually allocated to the respective pulses of the recording pulse pattern. Each of the write powers, allocated to the respective pulses of the recording pulse pattern, is linearly varied in proportion with a change of one of the recording linear velocity and a recording position of the storage medium. The resulting recording pulse pattern is supplied to a pickup, and the pickup emits a light beam to the storage medium in accordance with the recording pulse pattern having the linearly varied write powers allocated to the respective pulses, so that one of the plural kinds of marks is recorded on the storage medium.

12 Claims, 6 Drawing Sheets

U.S. PATENT DOCUMENTS

| | | | |
|---|---|---|---|
| 5,815,477 A * | 9/1998 | Kimura et al. | 369/47.53 |
| 5,848,043 A | 12/1998 | Takada et al. | |
| 5,949,747 A * | 9/1999 | Miyashita et al. | 369/53.26 |
| 6,018,508 A * | 1/2000 | Hasegawa | 369/59.11 |
| 6,339,579 B1 * | 1/2002 | Kamioka et al. | 369/121 |
| 6,388,978 B1 | 5/2002 | Ogawa et al. | |
| 6,459,666 B1 * | 10/2002 | Yokoi | 369/47.15 |
| 6,459,670 B1 * | 10/2002 | Kuwahara et al. | 369/59.12 |
| 6,480,449 B1 | 11/2002 | Narumi et al. | |
| 6,628,595 B1 * | 9/2003 | Sasa et al. | 369/59.12 |
| 6,661,760 B1 * | 12/2003 | Nobukuni et al. | 369/59.11 |

FOREIGN PATENT DOCUMENTS

| | | |
|---|---|---|
| JP | 04-281217 | 6/1992 |
| JP | 08-050721 | 2/1996 |
| JP | 10-105970 | 4/1998 |
| JP | 11-232652 | 8/1999 |

\* cited by examiner

OPTICAL RECORDING METHOD AND APPARATUS FOR AN OPTICAL STORAGE MEDIUM

This application is a continuation of application Ser. No. 09/722,689 filed on Nov. 28, 2000, now U.S. Pat. No. 6,628,595, which claims priority under 35 U.S.C. 119 to the following foreign application: Japanese Application No. 11-338613, dated Nov. 29, 1999, the disclosure of both of which are hereby incorporated by reference.

BACKGROUND OF THE INVENTION

1. Field of the Invention

The present invention generally relates to an optical recording method and apparatus for an optical storage medium, and more particularly to an optical recording method and apparatus that achieves the recording of a high-density optical storage medium at a high recording speed above a basic recording speed by setting the recording pulse pattern so as to match with either a constant-angular-velocity recording process or a variable-linear-velocity recording process.

2. Description of the Related Art

As disclosed in Japanese Laid-Open Patent Application No.11-232652, an optical recording method is known, and this optical recording method is aimed at achieving appropriate recording of an optical storage medium at a high recording speed above a basic recording speed. In the optical recording method of the above document, the recording pulse pattern is set, when performing the high-speed recording, such that the width of a top recording pulse and the width of a following recording pulse are respectively larger than those of the recording pulse pattern that is set when performing the basic-speed recording. Alternatively, when performing the high-speed recording, the recording light power is set such that it is larger than the recording light power that is set when performing the basic speed recording.

Today, in order to achieve speedy recording of CD-R (compact disk recordable) and CD-RW (compact disk rewritable) media, the recording of these media is performed at not only the basic recording speed but also the double or quadruple recording speed. There is an increasing demand for achieving high-speed recording of DVD media in order to shorten the recording time of DVD media that are high-density optical storage media. For example, consideration is given to achieving high-speed recording of a DVD-R by performing the CAV (constant angular velocity) recording or the ZCAV (z-constant angular velocity) recording. In such a case, if the basic recording speed is used at the innermost track of the optical disk, a 2.5-times higher recording speed is needed at the outermost track of the optical disk. The recording linear velocity when performing the constant angular velocity recording depends on the radius of the recording position or the track of the optical disk.

Generally, if the recording pulsewidth is solely controlled in accordance with the recording linear velocity so as to cover a required range of the recording linear velocity (e.g., the range between the basic recording speed and the 2.5-times higher recording speed), the effect to improve the jitter is apt to become inadequate. In order to increase the effect of the jitter improvement and match with the required range of the recording linear velocity, it is necessary to appropriately control not only the recording pulsewidth but also the recording power in accordance with the recording linear velocity or the recording position of the disk.

It is desirable that the control of the recording pulsewidth can be performed as simply as possible when controlling both the recording pulsewidth and the recording power in accordance with the recording linear velocity. If many control parameters must be controlled or the setting of control parameters is complicated, small errors of the individual control parameters in combination will be significant, which causes the deterioration of the jitter that is unexpectedly serious.

The conventional optical recording method of the above document utilizes a multi-pulse recording scheme in which two or more sequences of recording pulses, each sequence including multiple pulses, are used. To record one of two or more kinds of marks having different lengths on the storage medium, a corresponding one of the two or more sequences of recording pulses is selected. The thermal interference of the multiple pulses greatly depends on the recording linear velocity. Hence, it is necessary for the conventional optical recording method of the above document to individually control the pulsewidths of the respective pulses included in the selected sequence in a complicated manner. It is necessary to determine a different amount of correction of the recording pulsewidth for each of the different kinds of marks in accordance with the recording linear velocity or the recording position. Further, it is necessary to determine a specific amount of correction of the recording pulsewidth for a mark that is interposed between the preceding space and the following space with certain lengths.

Therefore, when the recording pulsewidth is controlled in accordance with the recording linear velocity or the recording position, there is a problem in that many control parameters must be controlled or the setting of control parameters is complicated. For example, the amount of correction of the recording pulsewidth allocated for one of different kinds of marks is considerably different from the amount of correction of the recording pulsewidth allocated for another of the different kinds of marks. In the control of the recording pulsewidth, the correction of the recording pulsewidth must be performed for all of the marks to be recorded on the storage medium.

In addition, it is desirable that each control parameter can be expressed as a continuous linear function of the recording position or the recording linear velocity. If the control parameter is not expressed as a continuous linear function, the optimum control parameter does not have a constant value for an error of the recording linear velocity (or the recording position), it is rapidly fluctuated, and the deterioration of the jitter is not prevented sufficiently. If the control parameter is expressed as a discontinuous function, the optimum control parameter is rapidly fluctuated for an error of the recording linear velocity, and the deterioration of the jitter is not prevented sufficiently.

Specifically, suppose that a high-speed recording of a DVD-R is achieved when performing the CAV recording process. As described above, if the basic recording speed is used at the innermost track of the disk, the 2.5-times higher recording speed is created at the outermost track of the disk.

The standard of DVD-R specifications specifies that the (n−2) multi-pulse recording scheme be used when performing the recording at the basic recording speed. For example, in the (n−2) multi-pulse recording scheme, a recording pulse waveform for a 3T data consists of a single (=3−2) recording pulse, a recording pulse waveform for a 4T data consists of two (=4−2) recording pulses, and a recording pulse waveform for a 6T data consists of four (=6−2) recording pulses. FIG. 9 shows the recording pulse waveform for the 6T data when the (n−2) multi-pulse recording scheme is used.

In FIG. 9, "T" indicates a unit length corresponding to a channel bit, "TSFP" indicates a time duration from the rising edge of the 6T data to the rising edge of the top pulse, "TEFP" indicates a time duration from the rising edge of the 6T data to the trailing edge of the top pulse, "TSMP" indicates a time duration from one third of the 6T data to the rising edge of the following pulse, "TEMP" indicates a time duration from one third of the 6T data to the trailing edge of the following pulse, "TSLP" indicates a time duration from two thirds of the 6T data to the rising edge of the last pulse, and "TELP" indicates a time duration from two thirds of the 6T data to the trailing edge of the last pulse.

However, if the (n−2) multi-pulse recording scheme is used at the 2.5-times higher recording speed, the energy of the recording light needed to record short marks at the outer tracks of the disk will be insufficient. In the above case, it is difficult to obtain the recording characteristics (in particular, the recording of short marks on the disk) that are equivalent to those obtained at the basic recording speed. To eliminate the problem, it is desired to selectively use the (n−1) multi-pulse recording scheme, instead of the (n−2) multi-pulse recording scheme, when the recording is performed at the 2.5-times higher recording speed. If the (n−1) multi-pulse recording scheme is selectively used at the 2.5-times higher recording speed, the recording characteristics that are equivalent to those obtained at the basic recording speed can be obtained. For example, in the (n−1) multi-pulse recording scheme, a recording pulse waveform for a 3T data consists of two (=3−1) recording pulses, and a recording pulse waveform for a 4T data consists of three (=4−1) recording pulses. FIG. 10 shows a recording pulse waveform for a 6T data when the (n−1) multi-pulse recording scheme is used. The recording pulse waveform shown in FIG. 10 consists of five recording pulses.

The notations of FIG. 10 are essentially the same as those of FIG. 9 except that, in FIG. 10, "TSLP" indicates a time duration from five sixths of the 6T data to the rising edge of the last pulse, and "TELP" indicates a time duration from five sixths of the 6T data to the trailing edge of the last pulse.

As described above, when the recording pulsewidth is controlled in accordance with the recording position of the disk during the CAV recording process, it is necessary to switch, at a certain intermediate position of the disk, between the (n−2) multi-pulse recording scheme and the (n−1) multi-pulse recording scheme, in order to avoid the insufficiency of the recording light energy at the outer tracks of the disk. In addition, for the ease of the control parameter setting and for the improvement of the jitter characteristics, it is necessary to perform continuously the switching from the (n−2) multi-pulse recording scheme to the (n−1) multi-pulse recording scheme in accordance with the recording position or the recording linear velocity.

One conceivable method of the continuous switching is that the recording pulsewidth of the last pulse within the multi-pulse waveform is controlled in accordance with the recording position of the disk, such that the rising edge of the last pulse approaches the trailing edge of the last one of the middle pulses within the multi-pulse waveform. Alternatively, the recording pulsewidth of the top pulse within the multi-pulse waveform may be controlled in a similar manner such that the trailing edge of the top pulse approaches the rising edge of the first one of the middle pulses within the multi-pulse waveform. However, the range of the recording pulsewidth that can be adjusted in the multi-pulse waveform is limited. It is very difficult to make the time duration between the rising edge of the last pulse and the trailing edge of the last middle pulse within the multi-pulse waveform infinitely approach zero. Hence, it is very difficult to make the above method of the continuous switching feasible.

Another conceivable method of the continuous switching is that the recording pulsewidth of the last pulse within the multi-pulse waveform is controlled in accordance with the recording position of the disk, such that the rising edge of the last pulse approaches the trailing edge of the last one of the middle pulses within the multi-pulse waveform while the pulsewidth of the last pulse is reduced. Alternatively, the recording pulsewidth of the top pulse within the multi-pulse waveform may be controlled in a similar manner such that the trailing edge of the top pulse approaches the rising edge of the first one of the middle pulses within the multi-pulse waveform while the pulsewidth of the top pulse is reduced. However, it is very difficult to make the pulsewidth of the last pulse (or the top pulse) within the multi-pulse waveform infinitely approach zero. Hence, it is very difficult to make the above method of the continuous switching feasible.

SUMMARY OF THE INVENTION

Accordingly, it is a general object of the present invention to provide an improved optical recording method and apparatus in which the above-described problems are eliminated.

Another object of the present invention is to provide an optical recording method and apparatus that can easily achieve the high-speed recording of a high-density optical storage medium at a high recording speed above the basic recording speed by setting the recording pulse pattern so as to match with a CAV/ZCAV recording process in which the recording angular velocity is constant.

Another object of the present invention is to provide an optical recording method and apparatus that can easily achieve the high-speed recording of a high-density optical storage medium at a high recording speed above the basic recording speed by setting the recording pulse pattern so as to match with a recording process in which the recording linear velocity is variable.

According to one preferred embodiment of the present invention, an optical recording method for an optical storage medium in which a recording pulse pattern having a sequence of multiple pulses is used to record one of plural kinds of marks with different lengths on the storage medium through a recording process wherein a recording linear velocity is variable, includes the steps of: allocating individually two or more discrete write powers to the respective pulses of the recording pulse pattern; linearly varying each of the write powers, allocated to the respective pulses of the recording pulse pattern, in proportion with a change of one of the recording linear velocity and a recording position of the storage medium; and supplying the recording pulse pattern to a pickup, the pickup emitting a light beam to the storage medium in accordance with the recording pulse pattern having the linearly varied write powers allocated to the respective pulses, so that one of the plural kinds of marks is recorded on the storage medium.

According to another preferred embodiment of the present invention, an optical recording method for an optical storage medium in which a recording pulse pattern having a sequence of multiple pulses is used to record one of plural kinds of marks with different lengths on the storage medium through a CAV or ZCAV recording process wherein the recording angular velocity is constant, includes the steps of: allocating individually two or more discrete write powers to the respective pulses of the recording pulse pattern; linearly varying each of the write powers, allocated to the respective pulses of the recording pulse pattern, in proportion with a change of one of a recording linear velocity and a recording position of the storage medium; and supplying the recording pulse pattern to a pickup, the pickup emitting a light beam to the storage medium in accordance with the recording pulse pattern having the linearly varied write powers allocated to the respective pulses, so that one of the plural kinds of marks is recorded on the storage medium.

According to another preferred embodiment of the present invention, an optical recording apparatus for an optical storage medium in which a recording pulse pattern having a sequence of multiple pulses is used to record one of plural kinds of marks with different lengths on the storage medium through a recording process in which a recording linear velocity is variable, the optical recording apparatus including: a write power allocation unit which allocates individually two or more discrete write powers to the respective pulses of the recording pulse pattern; a write power control unit which linearly varies each of the write powers, allocated to the respective pulses of the recording pulse pattern by the write power allocation unit, in proportion with a change of one of the recording linear velocity and a recording position of the storage medium; and a recording pulse pattern supply unit which supplies the recording pulse pattern, output by the write power control unit, to a pickup, the pickup emitting a light beam to the storage medium in accordance with the recording pulse pattern having the linearly varied write powers allocated to the respective pulses, so that one of the plural kinds of marks is recorded on the storage medium.

According to another preferred embodiment of the present invention, an optical recording apparatus for an optical storage medium in which in which a recording pulse pattern having a sequence of multiple pulses is used to record one of plural kinds of marks with different lengths on the storage medium through a CAV or ZCAV recording process in which the recording angular velocity is constant, comprising: a write power allocation unit which allocates individually two or more discrete write powers to the respective pulses of the recording pulse pattern; a write power control unit which linearly varies each of the write powers, allocated to the respective pulses of the recording pulse pattern by the write power allocation unit, in proportion with a change of one of a recording linear velocity and a recording position of the storage medium; and a recording pulse pattern supply unit which supplies the recording pulse pattern, output by the write power control unit, to a pickup, the pickup emitting a light beam to the storage medium in accordance with the recording pulse pattern having the linearly varied write powers allocated to the respective pulses, so that one of the plural kinds of marks is recorded on the storage medium.

In the optical recording method and apparatus of the above preferred embodiments, the first and second write powers, allocated to the pulses of the recording pulse pattern, are linearly varied in proportion with a change of the recording linear velocity, and the first and second write powers are expressed as a continuous linear function of the recording linear velocity. Hence, the recording power control can be easily performed and the deterioration of the jitter can be sufficiently prevented. The optical recording method and apparatus of the present invention are effective in easily performing the high-speed recording of the optical storage medium at a high recording speed above the basic recording speed by setting the recording pulse pattern so as to match with either the constant-angular-velocity recording process or the variable-linear-velocity recording process.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of preferred embodiments of the present invention with reference to the accompanying drawings.

Figure 11:
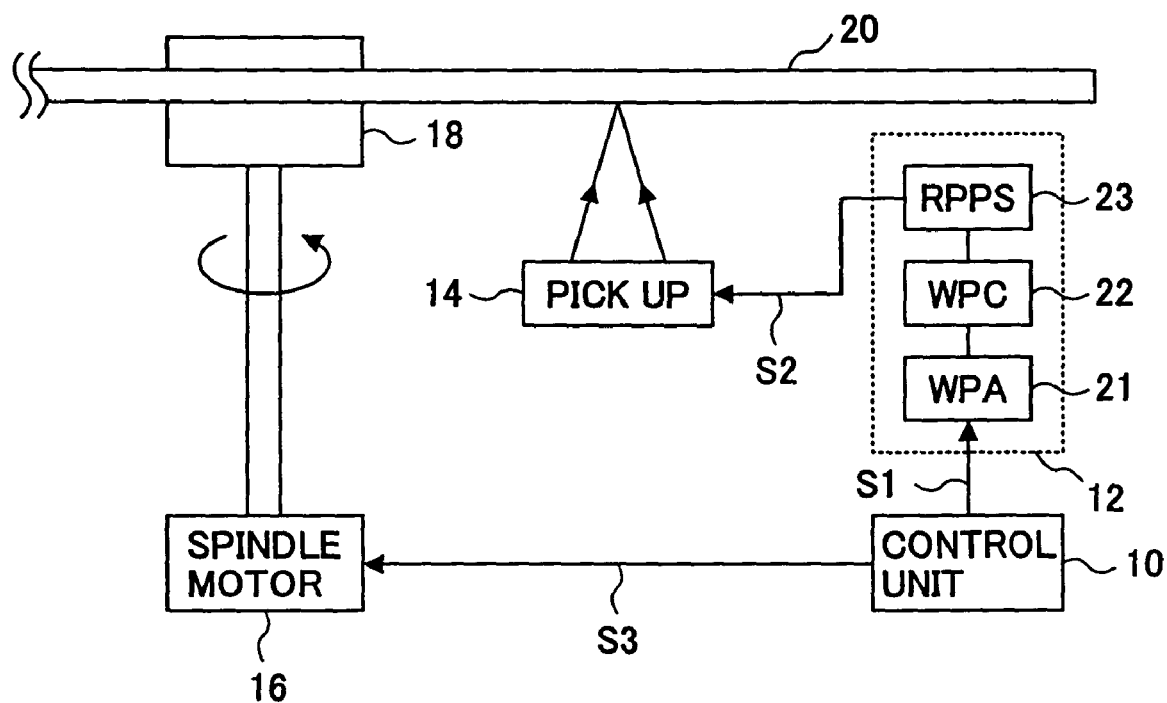
FIG. 11 is a diagram showing an optical recording apparatus which carries out one preferred embodiment of the optical recording method of the invention.

FIG. 11 shows an optical recording apparatus which carries out one embodiment of the optical recording method of the present invention.

As shown in FIG. 11, the optical recording apparatus of the present embodiment generally includes a control unit 10, a recording pulse pattern generator 12, a pickup 14, a spindle motor 16, and a turntable 18. The recording pulse pattern generator 12 includes a write power allocation unit ("WPA") 21, a write power control unit ("WPC") 22, and a recording pulse pattern supply unit ("RPPS") 23.

Suppose that, in the optical recording apparatus of FIG. 11, a high-density optical storage medium 20 (for example, a DVD) is placed onto the turntable 18, and, during recording or reproducing operation of the optical recording apparatus, the storage medium 20 is rotated at a given rotation speed by the spindle motor 18. The control unit 10 supplies a motor drive signal "S3" to the spindle motor 16, and the spindle motor 16 rotates the turntable 18 on which the storage medium 20 is placed, at the given rotation speed in accordance with the motor drive signal "S3". Hereinafter, the storage medium 20 is called the optical disk 20, for the sake of convenience of description.

In the optical recording apparatus of FIG. 11, the pickup 14 writes information to the optical disk 20 by emitting a writing light beam (for example, a laser beam) to the optical disk 20. The pickup 14 reads information from the optical disk 20 by emitting a reading light beam to the optical disk 20 and receiving a reflected beam from the optical disk 20. The pickup 14 generally includes a light source (not shown) that emits the writing or reading light beam. The light source is, for example, a semiconductor laser that emits a laser beam. In the optical recording apparatus of FIG. 11, a pickup actuating device (not shown) is provided to actuate the pickup 14 to a desired recording position on the optical disk 20 in a radial direction of the disk 20 under the control of the control unit 10.

In the optical recording apparatus of FIG. 11, the recording pulse pattern generator 12 outputs a recording pulse pattern "S2" to the pickup 14 in accordance with a writing data "S1" supplied from the control unit 10. The control unit 10 controls the entire optical recording apparatus. In the present embodiment, the control unit 10 and the recording pulse pattern generator 12 are constituted by a microcomputer.

The recording pulse pattern generator 12 of the optical recording apparatus according to the present invention utilizes an improved multi-pulse recording scheme, which will be described later. Similar to the previously described conventional optical recording apparatus, in the improved multi-pulse recording scheme of the recording pulse pattern generator 12, two or more sequences of recording pulses, each sequence including a predetermined number of multiple pulses, are used. To record one of plural kinds of marks having different lengths on the storage medium 20, a corresponding one of the two or more sequences of recording pulses is selected.

In the recording pulse pattern generator 12, when the writing data S1 supplied by the control unit 12 is received at the input of the recording pulse pattern generator 12, the write power allocation unit ("WPA") 21 allocates individually two or more discrete write powers to the respective pulses of a recording pulse pattern S2 to be outputted to the pickup 14. The write power control unit ("WPC") 22 linearly varies each of the write powers, allocated to the respective pulses of the recording pulse pattern S2, in proportion with a change of the recording linear velocity or the recording position of the storage medium 20. The recording pulse pattern supply unit ("RPPS") 23 supplies the recording pulse pattern S2, having the linearly varied write powers allocated to the respective pulses, to the pickup 14. Hence, the pickup 14 emits the light beam to the storage medium 20 in accordance with the recording pulse pattern S2 so that one of the plural kinds of marks is recorded on the storage medium 20.

The optical recording method and apparatus of the present invention are characterized by the recording pulse pattern generator 12 described above. The key features of the recording pulse pattern generator 12 according to the present invention are (1) the setting of the recording pulsewidth is fixed (or the recording pulsewidth is based on the recording frequency and is set to a fixed value as specified by the standard), (2) two or more discrete write powers are individually allocated to the respective pulses of the recording pulse pattern, wherein the recording pulse pattern optimized to the maximum recording speed of the storage medium 20 is basically used, and (3) the write powers, allocated to the respective pulses of the recording pulse pattern, are linearly varied in proportion with a change of the recording linear velocity or the recording position of the storage medium 20.

In the recording pulse pattern generator 12 according to the present invention, the two or more discrete write powers are individually allocated to the respective pulses of the recording pulse pattern, wherein the recording pulse pattern optimized to the maximum recording speed of the storage medium 20 is basically used, and the write powers, allocated to the respective pulses of the recording pulse pattern, are linearly varied in proportion with a change of the recording linear velocity or the recording position of the storage medium 20. Even if the recording linear velocity or the recording position of the storage medium 20 changes, the recording pulsewidth is based on the recording frequency and set to the fixed value. Hence, it is unnecessary to control the recording pulsewidth in accordance with the change of the recording linear velocity or the recording position of the storage medium 20. Alternatively, however, the control of the recording pulsewidth may be performed in addition to the write power allocation and the write power control.

Further, in the recording pulse pattern generator 12 according to the present invention, the recording pulse pattern optimized to the maximum recording speed of the storage medium 20 is basically used. The write powers allocated to the pulses of the recording pulse pattern are linearly varied in proportion with a change of the recording linear velocity within a required range from the minimum recording speed to the maximum recording speed. The recording pulse pattern optimized to the maximum recording speed can be used for the low-speed recording without causing the insufficiency of the recording light energy.

Further, in the optical recording method and apparatus of the present invention, two or more sequences of recording pulses, each sequence including a predetermined number of multiple pulses, are used. To record one of plural kinds of marks having different lengths on the storage medium 20, a corresponding one of the two or more sequences of recording pulses is selected. See "DVD Specifications for Recordable Disk (DVD-R), Part1 Physical Specifications Version 1.9 July 1998" for the recording pulse strategy of DVD-R. For example, in the (n–2) multi-pulse recording scheme described above, a recording pulse waveform for a 3T data consists of a single recording pulse (or the top pulse only), a recording pulse waveform for a 4T data consists of two recording pulses (or the top pulse and the last pulse), a recording pulse waveform for a 5T data consists of three recording pulses (or the top pulse, the middle pulse and the last pulse), and a recording pulse waveform for a 6T data consists of four recording pulses (or the top pulse, the two middle pulses and the last pulse). In the present embodiment, the 3T-data recording pulse waveform and the 4T-data recording pulse waveform are considered different from each other, and the top pulse of the 3T-data recording pulse waveform and the top pulse of the 4T-data recording pulse waveform are considered different from each other. The top pulse, the middle pulse and the last pulse of the 5T-data recording pulse waveform are considered different from each other.

In the foregoing descriptions, the optical recording method and apparatus of the present invention uses the multi-pulse recording scheme in which, in order to record one of plural kinds of marks having different lengths on the storage medium, a corresponding one of the two or more sequences of recording pulses is selected. However, the present invention is not limited to the multi-pulse recording scheme. Alternatively, a rectangular wave recording scheme in which, in order to record any of the plural kinds of marks having different lengths on the storage medium, a single recording pulse is selected may be used in the optical recording method and apparatus of the present invention.

Further, the optical recording method and apparatus of the present invention is applicable to not only the CAV/ZCAV recording process but also the CLV recording process including the basic recording speed and the N-times higher recording speed. The optical recording method and apparatus of the present invention are effective in easily performing the high-speed recording of the optical storage medium at a high recording speed above the basic recording speed by setting the recording pulse pattern so as to match with either the constant-angular-velocity recording process or the variable-linear-velocity recording process.

Figure 1:
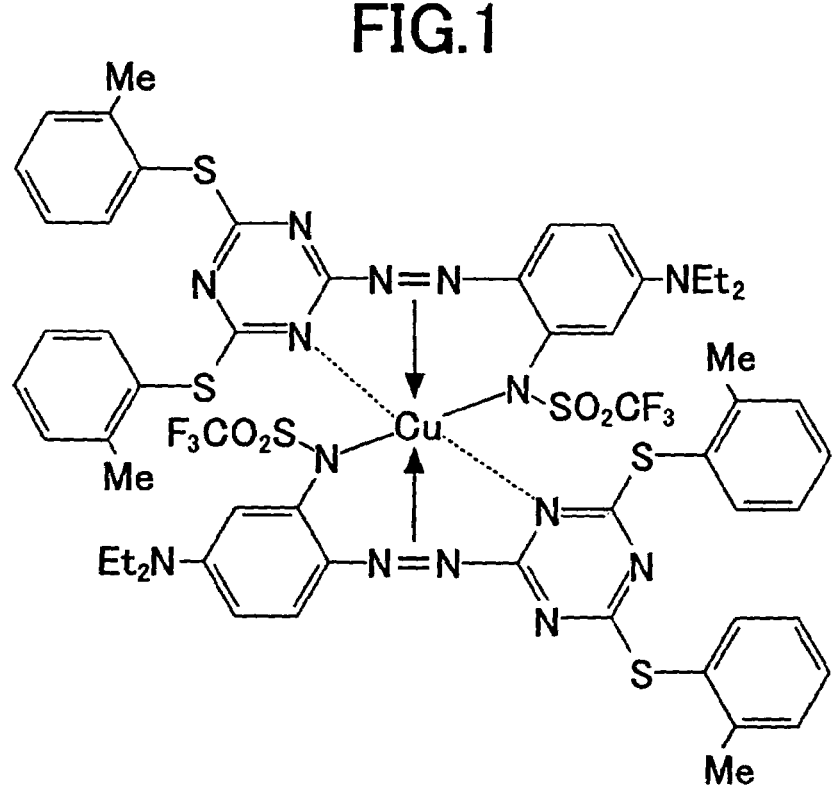
FIG. 1 is a diagram for explaining the chemical composition of a recording material of an optical storage medium used to evaluate the suitability of the optical recording method and apparatus of the invention.

FIG. 1 shows the chemical composition of a recording material of the optical storage medium 20 used to evaluate the suitability of the optical recording method and apparatus of the invention.

In the present embodiment, the optical storage medium 20 is prepared in the following manner. A recording layer, which contains as its major component the recording material having the chemical composition of FIG. 1, is formed on a substrate of polycarbonate through spin coating. The substrate has a track pitch of 0.74 µm and a thickness of 0.6 mm, which are specified for a 4.7-GB DVD. A reflection layer of gold is deposited on the recording layer through sputtering. Further, a protective layer of an UV-cure resin is formed on the reflection layer. The optical disk 20 is thus prepared to evaluate the suitability of the optical recording method and apparatus of the invention.

By using the above-mentioned optical disk 20, a recording pulse pattern (write strategy) optimized to the basic recording speed and a recording pulse pattern (write strategy) optimized to the 2.5-times higher recording speed are determined through the experiments. In the optimization of these recording pulse patterns, a single write power is allocated to the respective pulses of each recording pulse pattern. DDU-1000 manufactured by Pulsetech Kogyo Co. in Japan is used as a testing disk drive in which the recording is performed on the optical disk 20 in order for evaluating the suitability of the optical recording method and apparatus of the invention. The testing disk drive includes a pickup that is similar to the pickup 14 in the optical recording apparatus of FIG. 11. In the pickup of the testing disk drive, the wavelength of a laser beam emitted by a laser light source is 660 nm, the numerical aperture (NA) of a focusing lens is 0.63, the beam spot diameter in tangential direction ($1/e^2$) is 0.90 µm, the beam spot diameter in radial direction ($1/e^2$) is 0.92 µm, the rim intensity in tangential direction is 0.560, and the rim intensity in radial direction is 0.402.

When the recording is performed on the optical disk 20 at the basic recording speed (the recording linear velocity: 3.5 m/s, the recording frequency: 26.23 MHz), the recording pulse pattern optimized to the basic recording speed is used. If the write power allocated to the pulses of the recording pulse pattern is set at 9.8 mW, then the data-to-clock jitter is 6.3%. Further, when the recording is performed on the optical disk 20 at the 2.5-times higher recording speed (the recording linear velocity: 8.5 m/s, the recording frequency: 26.7 MHz), the recording pulse pattern optimized to the 2.5-times higher recording speed is used. If the write power allocated to the pulses of the recording pulse pattern is set at 14.5 mW, then the data-to-clock jitter is 7.2%.

The recording pulse pattern optimized to the basic recording speed is first used to evaluate the suitability of the testing disk drive to the high-speed recording. Specifically, the recording pulsewidth is based on the recording frequency and set to a fixed value as specified by the standard. The actual light emission duration is represented by (the fixed value of the recording pulsewidth)×(1000/the recording frequency). Namely, the recording pulsewidth is set to the fixed value but the actual light emission duration varies in inverse proportion with the recording frequency. The single recording power is solely adjusted in accordance with a change of the recording linear velocity of the optical disk such that a minimum level of the data-to-clock jitter can be obtained.

Figure 2:
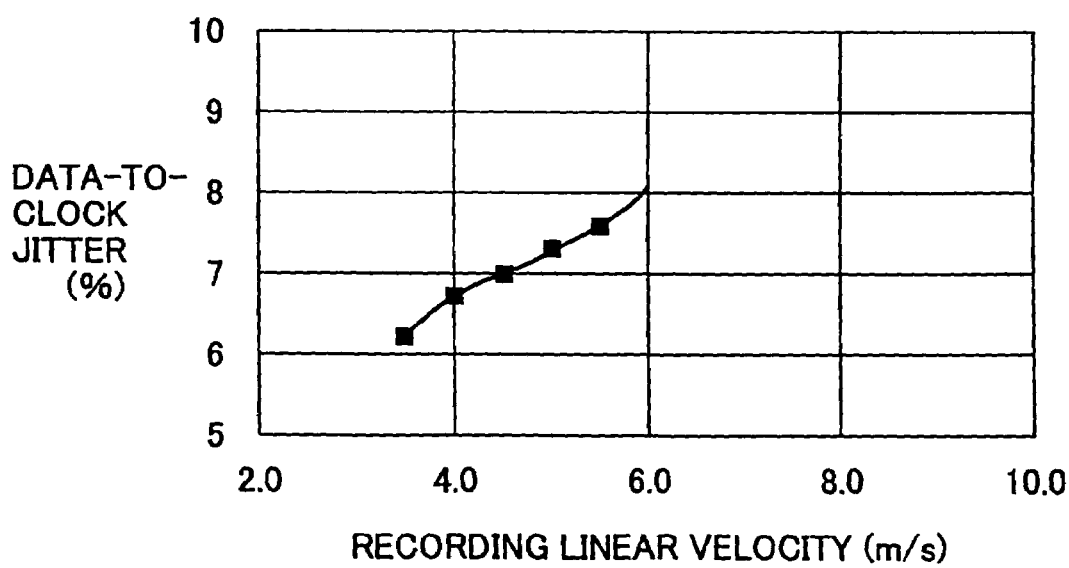
FIG. 2 is a diagram for explaining a relationship between the recording linear velocity and the data-to-clock jitter wherein the recording pulse pattern optimized to the basic recording speed is used to evaluate the suitability of a testing disk drive to the high-speed recording.

FIG. 2 shows a relationship between the recording linear velocity and the data-to-clock jitter wherein the recording pulse pattern optimized to the basic recording speed is used to evaluate the suitability of the testing disk drive to the high-speed recording. As shown in FIG. 2, when the recording pulse pattern optimized to the basic recording speed is used, the jitter rapidly deteriorates as the recording linear velocity increases. The oscillation power of the laser light source in the testing disk drive is limited, and the upper-limit recording power of the testing disk drive is 15.0 mW.

Figure 3:
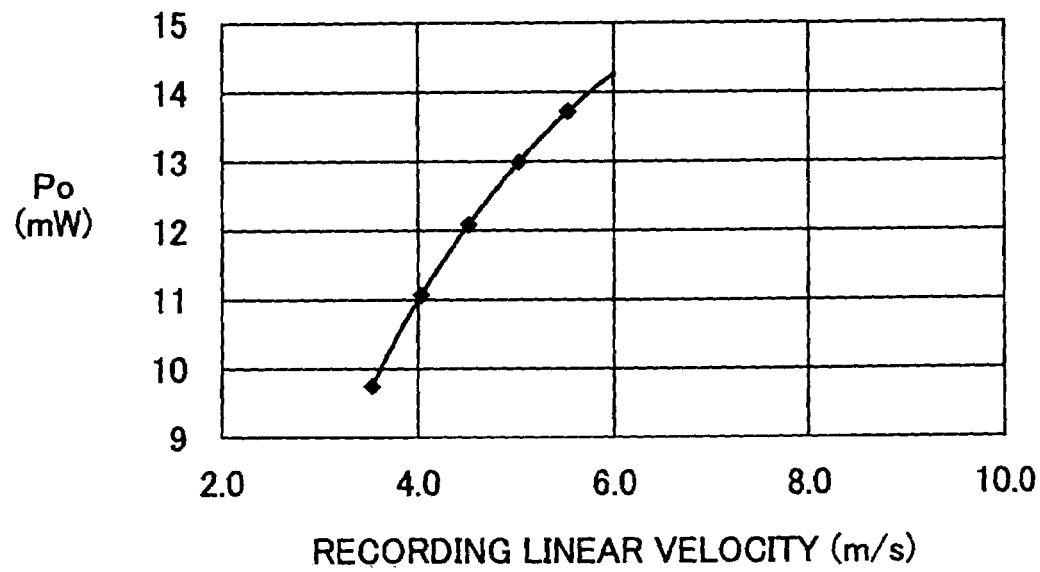
FIG. 3 is a diagram for explaining a relationship between the recording linear velocity and the recording power wherein the recording pulse pattern optimized to the basic recording speed is used to evaluate the suitability of the testing disk drive to the high-speed recording.

FIG. 3 shows a relationship between the recording linear velocity and the recording power wherein the recording pulse pattern optimized to the basic recording speed is used to evaluate the suitability of the testing disk drive to the high-speed recording. As shown in FIG. 3, the recording linear velocity that can be used with the recording pulse pattern (write strategy) optimized to the basic recording speed is up to about 7.0 m/s because of the upper-limit recording power of the testing disk drive. In FIG. 3, "Po" indicates the optimum recording power for a specific recording linear velocity.

Accordingly, it is made certain that, when the jitter and the recording power are taken into consideration, the recording pulse pattern optimized to the basic recording speed is not suitable for the high-speed recording of the CAV/ZCAV recording process or the CLV recording process. If the CAV/ZCAV recording process is used, it is required to cover the range of the recording linear velocity from the basic recording speed (3.5 m/s) to the 2.5-times higher recording speed (8.5 m/s).

Further, the recording pulse pattern optimized to the 2.5-times higher recording speed is next used to evaluate the suitability of the testing disk drive to the low-speed recording. Specifically, the recording pulsewidth is based on the recording frequency and set to a fixed value as specified by the standard. The actual light emission duration is represented by (the fixed value of the recording pulsewidth)× (1000/the recording frequency). Namely, the recording pulsewidth is set to the fixed value but the actual light emission duration varies in inverse proportion with the recording frequency. The single recording power is solely adjusted in accordance with a change of the recording linear velocity of the optical disk such that a minimum level of the data-to-clock jitter can be obtained.

Figure 4:
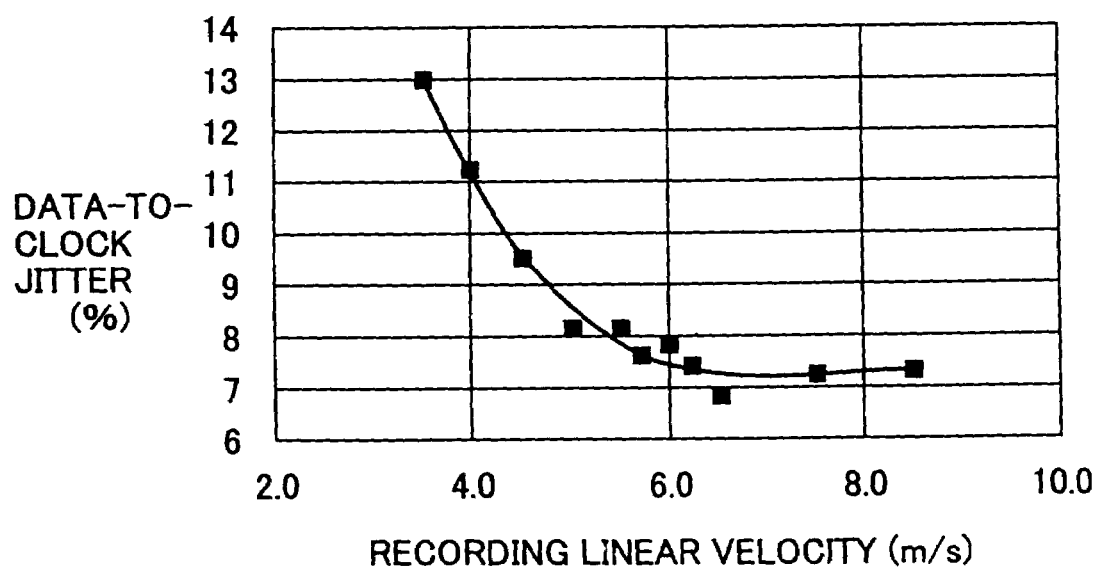
FIG. 4 is a diagram for explaining a relationship between the recording linear velocity and the data-to-clock jitter wherein the recording pulse pattern optimized to the 2.5-times higher recording speed is used to evaluate the suitability of the testing disk drive to the low-speed recording.

FIG. 4 shows a relationship between the recording linear velocity and the data-to-clock jitter wherein the recording pulse pattern optimized to the 2.5-times higher recording speed is used to evaluate the suitability of the testing disk drive to the low-speed recording. As shown in FIG. 4, when the recording pulse pattern optimized to the 2.5-times higher recording speed is used, the jitter is almost flat when the recording linear velocity is between 5.0 m/s and 8.5 m/s, and the jitter rapidly deteriorates when the recording linear velocity is below the level of about 5.0 m/s.

Figure 5:
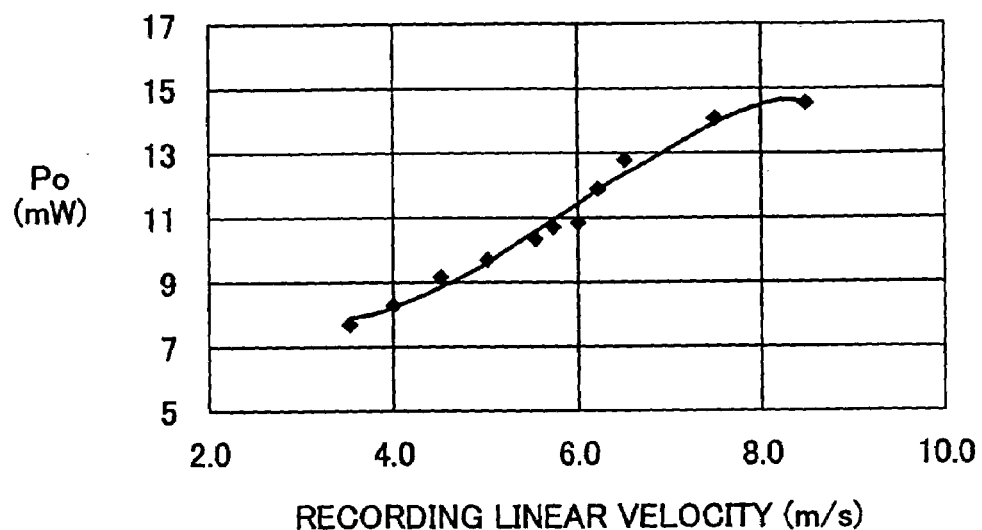
FIG. 5 is a diagram for explaining a relationship between the recording linear velocity and the recording power wherein the recording pulse pattern optimized to the 2.5-times higher recording speed is used to evaluate the suitability of the testing disk drive to the low-speed recording.

When the recording pulse pattern optimized to the 2.5-times higher recording speed is applied to the low-speed recording, the recording power is optimized such that the upper-limit recording power of the testing disk drive is not exceeded, and the optimum recording power becomes small as the recording linear velocity decreases. FIG. 5 shows a relationship between the recording linear velocity and the recording power wherein the recording pulse pattern optimized to the 2.5-times higher recording speed is used to evaluate the suitability of the testing disk drive to the low-speed recording. As shown in FIG. 5, the testing disk drive in the present case is not subjected to the problem of the recording power as in the previous case of FIG. 2 wherein the recording pulse pattern optimized to the basic recording speed is used. In FIG. 5, "Po" indicates the optimum recording power for a specific recording linear velocity. Hence, if the recording pulse pattern optimized to the 2.5-times higher recording speed is applied to the CAV/ZCAV recording process or the CLV recording process, it is possible for the testing disk drive to cover the required range of the recording linear velocity from the basic recording speed (3.5 m/s) to the 2.5-times higher recording speed (8.5 m/s).

However, it is made certain that, when the jitter is taken into consideration, the recording pulse pattern optimized to the 2.5-times higher recording speed is not suitable for the low-speed recording of the CAV/ZCAV recording process or the CLV recording process.

Next, a description will be provided of the experiments that have been performed to evaluate the suitability of the optical recording method and apparatus of the invention wherein the recording pulse pattern (write strategy) optimized to the 2.5-times higher recording speed is used for the recording at the basic recording speed.

In the experiments, a recording pulse pattern (write strategy) optimized to the 2.5-times higher recording speed is used. Specifically, the recording pulse pattern (write strategy) is optimized at the recording linear velocity of 8.5 m/s and the recording frequency of 63.7 MHz, and the recording pulsewidth based on the recording frequency is set to a fixed value as specified by the standard.

As the examples of the (n–1) multi-pulse write waveform, a recording pulse waveform for 3T data and a recording pulse waveform for 4T data are used in the above experiments. Each of the recording pulse waveforms includes a sequence of recording pulses used to record one of the plural kinds of marks with different lengths (i.e., the 3T data and the 4T data) on the optical disk. The 3T recording pulse waveform consists of a top pulse (called $3T_{TOP}$) and a last pulse (called $3T_{LAST}$) while the 4T recording pulse waveform consists of a top pulse (called $4T_{TOP}$), a middle pulse (called $4T_{MP}$) and a last pulse (called $4T_{LAST}$). It can be readily understood that the 4T recording pulse waveform including the top pulse, the middle pulse and the last pulse can be extended, without loss of generality, to an NT (N: an integer greater than 4) recording pulse waveform including a top pulse, (N–3) middle pulses and a last pulse.

In the above experiments, a first write power W1 (=9.0 mW at the basic recording speed) and a second write power W2 (=8.5 mW at the basic recording speed) are individually allocated to the respective pulses of the 3T and 4T recording pulse waveforms, and the recording of marks on the optical disk is performed at the basic recording speed (the recording linear velocity is 3.5 m/s, the recording frequency is 26.23 MHz) by using the recording pulse pattern optimized to the 2.5-times higher recording speed. Then, the jitter characteristics as the results of the recording of the optical disk are measured. The measurement results of the above experiments are as in the following TABLE 1.

TABLE 1

| $3T_{TOP}$ | $3T_{LAST}$ | $4T_{TOP}$ | $4T_{MP}$ | $4T_{LAST}$ | Jitter (%) |
|---|---|---|---|---|---|
| W1 | W1 | W1 | W1 | W1 | 13.8 |
| W1 | W2 | W1 | W1 | W1 | 11.6 |
| W1 | W2 | W1 | W1 | W2 | 12.5 |
| W1 | W2 | W1 | W2 | W1 | 14.3 |
| W1 | W2 | W2 | W1 | W1 | 17.3 |
| W2 | W1 | W1 | W1 | W1 | 9.0 |
| W2 | W1 | W1 | W1 | W2 | 9.9 |
| W2 | W1 | W1 | W2 | W1 | 10.8 |
| W2 | W1 | W2 | W1 | W1 | 11.5 |
| W2 | W2 | W1 | W1 | W1 | 8.9 |
| W2 | W2 | W1 | W1 | W2 | 8.6 |
| W2 | W2 | W1 | W2 | W1 | 9.2 |
| W2 | W2 | W2 | W1 | W1 | 9.9 |

(W1 > W2)

As is apparent from the above TABLE 1, the allocation of the first and second write powers, which is appropriate for obtaining good jitter characteristics, is that the first write power W1 (>W2) is allocated to at least two of the $4T_{TOP}$, $4T_{MP}$ and $4T_{LAST}$ pulses and the second write power W2 (<W1) is allocated to the $3T_{TOP}$ and $3T_{LAST}$ pulses. In addition, the allocation of the first and second write powers, which is appropriate for obtaining good jitter characteristics, is that the first write power W1 is allocated to at least the $4T_{TOP}$ and $4T_{MP}$ pulses. Further, the allocation of the first and second write powers, which is appropriate for obtaining good jitter characteristics, is that the first write power W1 is allocated to at least the $4T_{TOP}$ and $4T_{MP}$ pulses and the second write power W2 is allocated to at least the $3T_{TOP}$ pulse.

As the result of the above experiments, it is made certain that the optical recording method and apparatus of the present invention in which the recording pulse pattern optimized to the 2.5-times higher recording speed is used for the recording at the basic recording speed are suitable to the low-speed recording. The recording pulsewidth based on the recording frequency is set to a fixed value as specified by the standard.

In the optical recording method and apparatus of the present invention, the first write power W1 and the second write power W2 are linearly varied in proportion with a change of the recording linear velocity within the required range from the basic recording speed to the 2.5-times higher recording speed. The recording pulse pattern optimized to the 2.5-times higher recording speed can be used for the low-speed recording without causing the insufficiency of the recording light energy. The recording pulsewidth is based on the recording frequency and it is set to a fixed value as specified by the standard.

Figure 6:
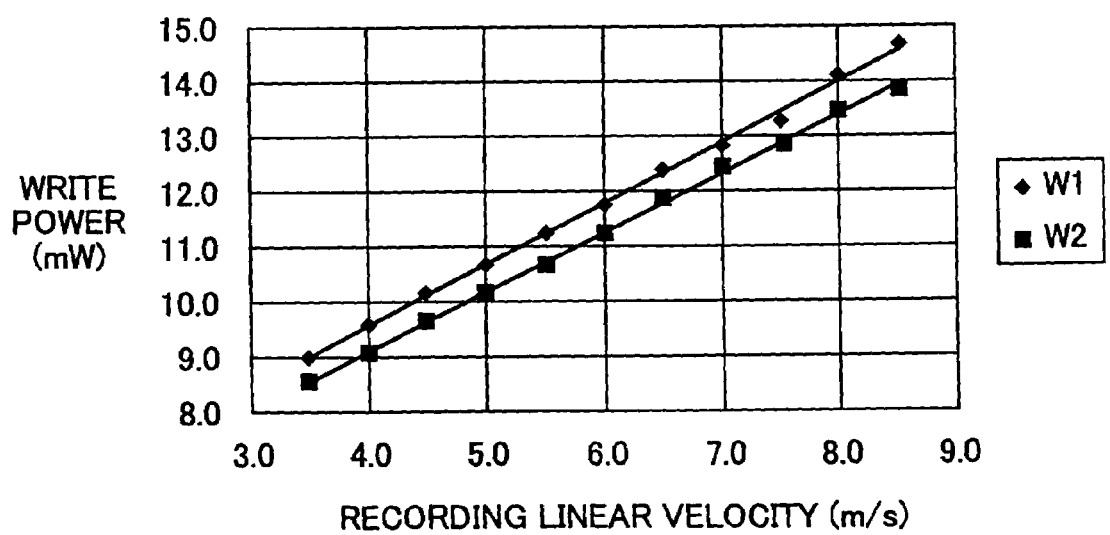
FIG. 6 is a diagram for explaining a relationship between the recording linear velocity and each of a first write power and a second write power which are optimized for a specific recording linear velocity when the recording linear velocity is changed.

FIG. 6 shows a relationship between the recording linear velocity and each of the first write power W1 and the second write power W2 which are optimized for a specific linear velocity such that each write power is linearly varied in proportion with a change in the recording linear velocity.

The recording linear velocity is changed within the required range from the basic recording speed to the 2.5-times higher recording speed.

From the results of the experiments shown in FIG. 6, it is made certain that each of the optimum write powers W1 and W2 can be expressed as a continuous linear function of the recording linear velocity. As shown in FIG. 6, the dependency of the optimum write power W1 on the recording linear velocity is essentially the same as the dependency of the optimum write power W2 on the recording linear velocity (or the linear functions of the two parameters have the same gradient), and it is made certain that the recording power control can be easily performed. Further, a change of the optimum write power W1 and a change of the optimum write power W2 for a change of the recording linear velocity are equal to each other at an arbitrary point of the recording linear velocity, and it is made certain that uniform jitter characteristics can be obtained.

Accordingly, the optical recording method and apparatus of the invention use the linearly varied write powers W1 and W2, and the optimum write powers W1 and W2 are expressed as the continuous linear function of the recording linear velocity. Hence, the recording power control of FIG. 6 can be easily performed and the deterioration of the jitter can be sufficiently prevented.

Figure 7:
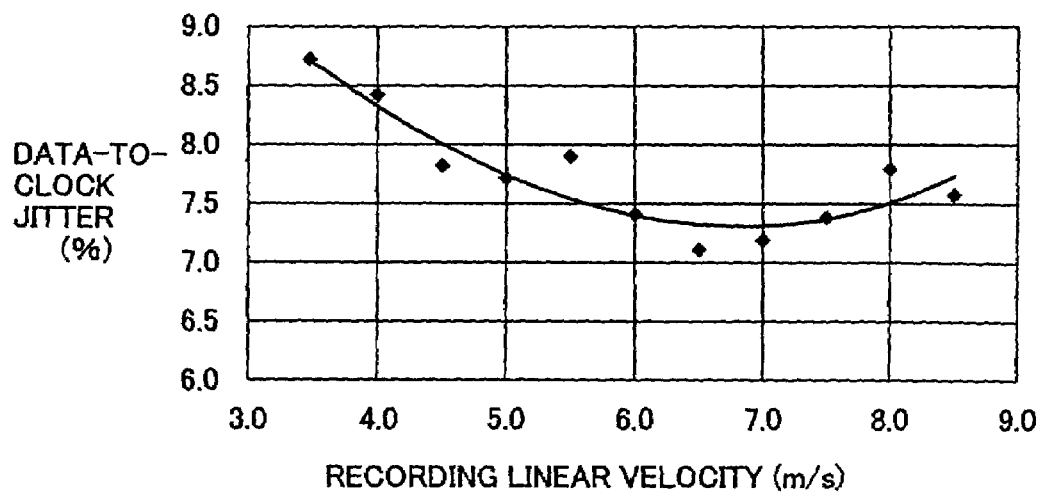
FIG. 7 is a diagram for explaining a relationship between the recording linear velocity and the data-to-clock jitter when the recording power control of FIG. 6 is used.

FIG. 7 shows a relationship between the recording linear velocity and the data-to-clock jitter when the recording power control of FIG. 6 is used. The experiment of FIG. 7 is performed to evaluate the jitter characteristics by allocating the first and second write powers W1 and W2 to the pulses of the recording pulse waveform as follows: $3T_{TOP}=W2$, $3T_{LAST}=W2$, $4T_{TOP}=W1$, $4T_{MP}=W1$, and $4T_{LAST}=W2$.

Figure 8:
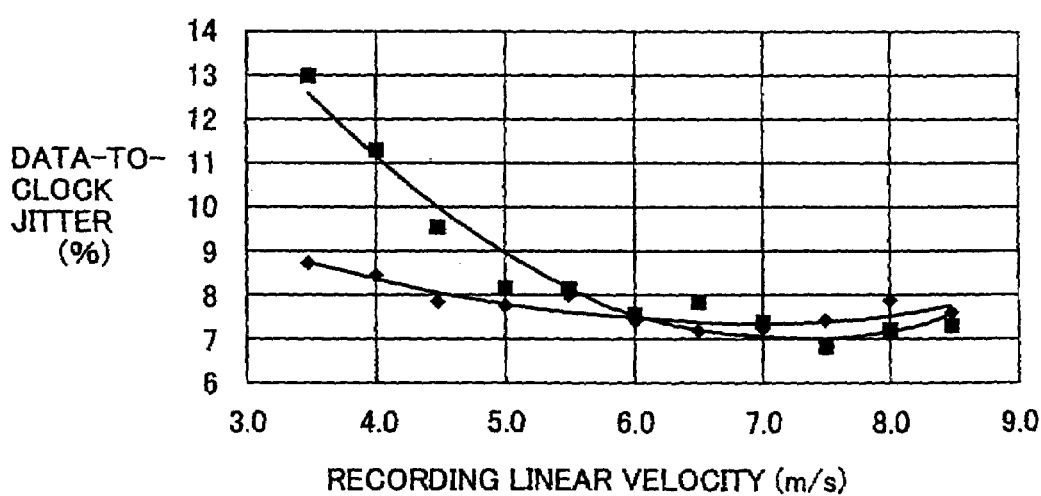
FIG. 8 is a diagram for explaining a relationship between the recording linear velocity and the data-to-clock jitter when the recording power control of FIG. 6 is not used.
Figure 9:
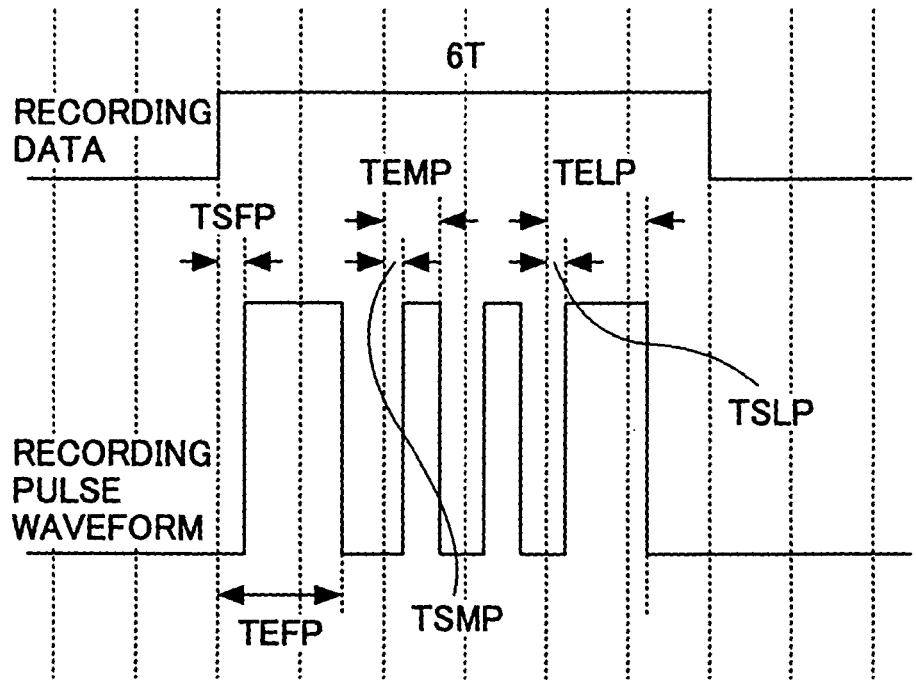
FIG. 9 is a diagram for explaining a recording pulse waveform for a 6T data when the (n−2) multi-pulse recording scheme is used.
Figure 10:
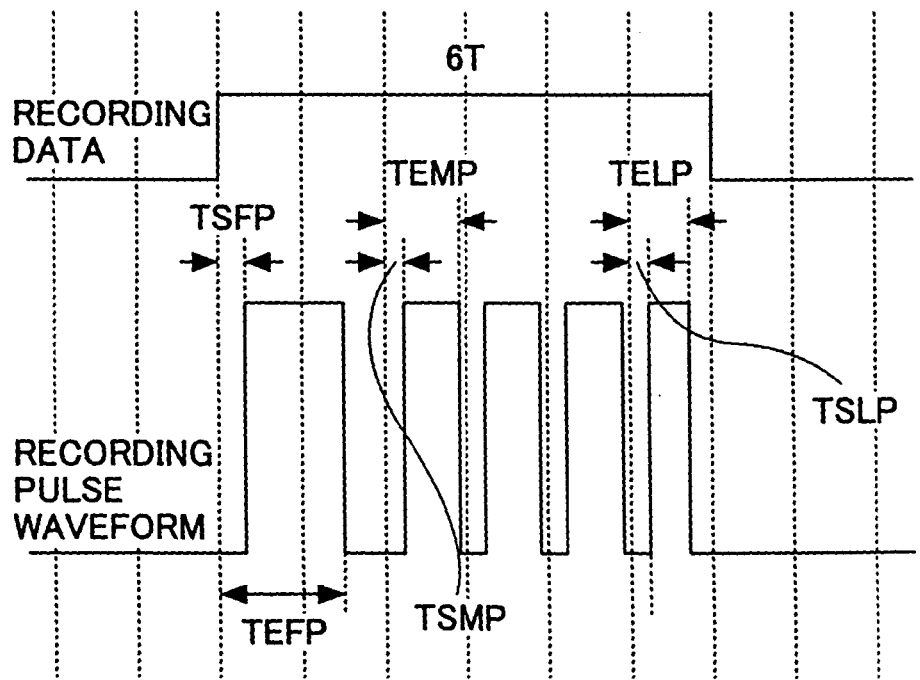
FIG. 10 is a diagram for explaining a recording pulse waveform for a 6T data when the (n−1) multi-pulse recording scheme is used.

FIG. 8 shows a relationship between the recording linear velocity and the data-to-clock jitter when the recording power control of FIG. 6 is not used. The experiment of FIG. 8 is performed to evaluate the jitter characteristics by setting the first and second write powers W1 and W2 to meet the condition W1=W2. The results of the experiment of FIG. 8 are provided for the purpose of comparison with the results of the experiment of FIG. 7.

From the results of the experiments shown in FIG. 7 and FIG. 8, it is made certain that, according to the optical recording method and apparatus of the invention using the linearly varied write powers W1 and W2, it is possible to provide low-level jitter characteristics for an arbitrary point of the recording linear velocity (in particular, for the basic recording speed) within the required range between the basic recording speed and the 2.5-times higher recording speed.

From the foregoing descriptions, one preferred embodiment of the optical recording method and apparatus of the invention uses the allocation of the linearly varied write powers: $3T_{TOP}=W2$, $3T_{LAST}=W1$, $4T_{TOP}=W1$, $4T_{MP}=W1$, and $4T_{LAST}=W1$ as in the TABLE 1 above, wherein the recording pulse pattern is set in accordance with the above allocation so that the recording is performed on the storage medium. The above preferred embodiment of the optical recording method and apparatus of the invention is effective in providing low-level jitter characteristics for an arbitrary point of the recording linear velocity when the variable-linear-velocity recording process or the constant-angular-velocity recording process is performed.

Another one preferred embodiment of the optical recording method and apparatus of the invention uses the allocation of the linearly varied write powers: $3T_{TOP}=W2$, $3T_{LAST}=W1$, $4T_{TOP}=W1$, $4T_{MP}=W1$, and $4T_{LAST}=W2$ as in the TABLE 1 above, wherein the recording pulse pattern is set in accordance with the above allocation so that the recording is performed on a high-density storage medium. The above preferred embodiment of the optical recording method and apparatus of the invention is effective in providing low-level jitter characteristics for an arbitrary point of the recording linear velocity when the variable-linear-velocity recording process or the constant-angular-velocity recording process is performed.

Another preferred embodiment of the optical recording method and apparatus of the invention uses the allocation of the linearly varied write powers: $3T_{TOP}=W2$, $3T_{LAST}=W2$, $4T_{TOP}=W1$, $4T_{MP}=W1$, and $4T_{LAST}=W1$ as in the TABLE 1 above, wherein the recording pulse pattern is set in accordance with the above allocation so that the recording is performed on a high-density optical storage medium. The above preferred embodiment of the optical recording method and apparatus of the invention is effective in providing low-level jitter characteristics for an arbitrary point of the recording linear velocity when the variable-linear-velocity recording process or the constant-angular-velocity recording process is performed.

Another preferred embodiment of the optical recording method and apparatus of the invention uses the allocation of the linearly varied write powers: $3T_{TOP}=W2$, $3T_{LAST}=W2$, $4T_{TOP}=W1$, $4T_{MP}=W1$, and $4T_{LAST}=W2$ as in the TABLE 1 above, wherein the recording pulse pattern is set in accordance with the above allocation so that the recording is performed on a high-density optical storage medium. The above preferred embodiment of the optical recording method and apparatus of the invention is effective in providing low-level jitter characteristics for an arbitrary point of the recording linear velocity when the variable-linear-velocity recording process or the constant-angular-velocity recording process is performed.

Another preferred embodiment of the optical recording method and apparatus of the invention uses the allocation of the linearly varied write powers: $3T_{TOP}=W2$, $3T_{LAST}=W2$, $4T_{TOP}=W1$, $4T_{MP}=W2$, and $4T_{LAST}=W1$ as in the TABLE 1 above, wherein the recording pulse pattern is set in accordance with the above allocation so that the recording is performed on a high-density optical storage medium. The above preferred embodiment of the optical recording method and apparatus of the invention is effective in providing low-level jitter characteristics for an arbitrary point of the recording linear velocity when the variable-linear-velocity recording process or the constant-angular-velocity recording process is performed.

Another preferred embodiment of the optical recording method and apparatus of the invention uses the allocation of the linearly varied write powers: $3T_{TOP}=W2$, $3T_{LAST}=W2$, $4T_{TOP}=W2$, $4T_{MP}=W1$, and $4T_{LAST}=W1$ as in the TABLE 1 above, wherein the recording pulse pattern is set in accordance with the above allocation so that the recording is performed on a high-density optical storage medium. The above preferred embodiment of the optical recording method and apparatus of the invention is effective in providing low-level jitter characteristics for an arbitrary point of the recording linear velocity when the variable-linear-velocity recording process or the constant-angular-velocity recording process is performed.

The above-described preferred embodiments of the optical recording method and apparatus of the invention are provided on the basis of the basic recording speed conditions that are the recording linear velocity (3.5 m/s) and the recording frequency (26.23 MHz) specified for a 4.7-GB DVD. However, the present invention is not limited to these conditions.

On the other hand, the standard of DVD specifications provides that the recording linear velocity is 3.49 m/s and the recording frequency is 26.16 MHz. However, in the experimental disk drive with which the above experiments have been performed, the recording linear velocity can be adjusted on the order of 0.1 m/s at the smallest. When the recording is performed at the basic recording speed, the recording linear velocity of 3.50 m/s and the recording frequency of 26.23 MHz are used in the above experiments because of the performance of the experimental disk drive.

In the above-described preferred embodiments of the optical recording method and apparatus of the invention, when the recording pulse pattern optimized to the high-speed recording is used, it is assumed that the 2.5-times higher recording speed (or the high-speed recording at the outermost track of the optical disk) is 8.5 m/s. The present invention is not limited to these conditions. For the evaluation of the suitability of the above preferred embodiments and the comparative examples, the reproducing of data from the optical disk is performed at the basic linear velocity of 3.5 m/s.

As described in the foregoing, the optical recording method and apparatus of the present invention are effective in easily performing the high-speed recording of the high-density optical storage medium at a high recording speed above the basic recording speed by setting the recording pulse pattern so as to match with either the constant-angular-velocity recording process or the variable-linear-velocity recording process.

The present invention is not limited to the above-described embodiments, and variations and modifications may be made without departing from the scope of the present invention.

Further, the present invention is based on Japanese priority application No.11-338613, filed on Nov. 29, 1999, the entire contents of which are hereby incorporated by reference.

What is claimed is:

1. An optical recording method for an optical storage medium, said method comprising the steps of:
   allocating two or more discrete write powers to a single recording pulse pattern;
   supplying the recording pulse pattern to the optical storage medium; and
   linearly varying each of the write powers in proportion with a change of one of a recording linear velocity and a recording position of the storage medium.

2. The optical recording method of claim 1, wherein the step of allocating the two or more discrete write powers to the single recording pulse pattern includes the step of allocating the two or more discrete write powers to a single rectangular recording pulse.

3. The optical recording method of claim 2, further comprising the step of supplying the recording pulse to a pickup, the pickup emitting a light beam to the storage medium in accordance with the recording pulse, so that one of plural kinds of marks is recorded on the storage medium.

4. An optical recording method for an optical storage medium, said method comprising the steps of:
   allocating two or more discrete write powers to a recording pulse pattern such that head-end and tail-end portions of the recording pulse pattern are higher in write power than an intermediate portion of the recording pulse pattern;
   supplying the recording pulse pattern to the optical storage medium; and
   linearly varying each of the write powers in proportion with a change of one of a recording linear velocity and a recording position of the storage medium.

5. The optical recording method of claim 4, wherein the step of allocating the two or more discrete write powers to the single recording pulse pattern includes the step of allocating the two or more discrete write powers to a single rectangular recording pulse.

6. The optical recording method of claim 5, further comprising the step of supplying the recording pulse to a pickup, the pickup emitting a light beam to the storage medium in accordance with the recording pulse, so that one of plural kinds of marks is recorded on the storage medium.

7. An optical recording apparatus for an optical storage medium, said apparatus comprising:
   a write power allocating unit for allocating two or more discrete write powers to a single recording pulse pattern;
   a recording pulse pattern supplying unit for supplying the recording pulse pattern to a pickup; and
   a write power control unit for linearly varying each of the write powers in proportion with a change of one of a recording linear velocity and a recording position of the storage medium.

8. The optical recording apparatus of claim 7, wherein the write power allocating unit is arranged to allocate the at least two or more discrete write powers to a single rectangular recording pulse.

9. The optical recording apparatus of claim 8, wherein the pickup is arranged to emit a light beam to the storage medium in accordance with the recording pulse, so that one of plural kinds of marks is recorded on the storage medium.

10. An optical recording apparatus for an optical storage medium, said apparatus comprising:
    a write power allocating unit for allocating two or more discrete write powers to a single recording pulse pattern, such that head-end and tail-end portions of the recording pulse pattern are higher in write power than an intermediate portion of the recording pulse pattern;
    a recording pulse pattern supplying unit for supplying the recording pulse pattern to a pickup; and
    a write power control unit for linearly varying each of the write powers in proportion with a change of one of a recording linear velocity and a recording position of the storage medium.

11. The optical recording apparatus of claim 10, wherein the write power allocating unit is arranged to allocate the at least two or more discrete write powers to a single rectangular recording pulse.

12. The optical recording apparatus of claim 11, wherein the pickup is arranged to emit a light beam to the storage medium in accordance with the recording pulse, so that one of plural kinds of marks is recorded on the storage medium.

* * * * *